United States Patent
Yeh

(10) Patent No.: US 7,468,567 B1
(45) Date of Patent: Dec. 23, 2008

(54) POWER SWITCHING APPARATUS AND NETWORK EQUIPMENT

(75) Inventor: Wei-Hao Yeh, Taichung (TW)

(73) Assignee: Universal Scientific Industrial Co., Ltd., Nan-Tou (TW)

( * ) Notice: Subject to any disclaimer, the term of this patent is extended or adjusted under 35 U.S.C. 154(b) by 0 days.

(21) Appl. No.: 12/007,492

(22) Filed: Jan. 11, 2008

(51) Int. Cl.
*H02J 9/00* (2006.01)
*H02J 4/00* (2006.01)

(52) U.S. Cl. .......................................... 307/80; 307/64
(58) Field of Classification Search .................. None
See application file for complete search history.

(56) References Cited

U.S. PATENT DOCUMENTS 7,194,639 B2 * 3/2007 Atkinson et al. ............ 713/300

2008/0151457 A1 * 6/2008 Apfel .......................... 361/111
2008/0168283 A1 * 7/2008 Penning ...................... 713/310

* cited by examiner

*Primary Examiner*—Michael J Sherry
*Assistant Examiner*—Adi Amrany
(74) *Attorney, Agent, or Firm*—Rosenberg, Klein & Lee

(57) ABSTRACT

The invention provides a power switching apparatus used in a network equipment in order to switch power generated by the Ethernet and an D.C. power supply. The power switching apparatus comprises a first input port used to connect to a first power terminal; a second input port used to connect to a second power terminal; an output port used to output a voltage; a switching circuit connected to the first input port, the second input port and the output port, wherein the switching circuit cuts off the output voltage generated by the first power terminal and outputs the voltage generated by the second power terminal while the second power terminal is plugged into the second input port.

7 Claims, 3 Drawing Sheets

POWER SWITCHING APPARATUS AND NETWORK EQUIPMENT

BACKGROUND OF THE INVENTION

1. Field of the Invention

The present invention is related to a power switching apparatus, especially to a power switching apparatus used to switch power generated by an Ethernet and DC power supply, and to equipment for the switch apparatus.

2. Description of Related Art

Traditional network equipment usually connects to a power supply to acquire operating power. Furthermore, data is transmitted by a network wire. Consequently, the traditional network equipment must have a network port and a power port so as to acquire operating power and data. Since this kind of traditional network equipment needs to connect to a power supply, the user must install a power supply and thus wires near the network equipment become multifarious. Therefore, a new technique named Power-Over-Ethernet (POE) is developed, the POE uses all codes of the Institute of Electrical & Electronic Engineers standard IEEE802.3af, so as to overcome the above problem.

Power-Over-Ethernet provides a network equipment with electric power via the network wire of the Ethernet. The network wire can be used to transmit data and power. The network equipment directly acquires operating electric power via the network wire of the Ethernet.

The network equipment which obtains electric power via the Ethernet usually doesn't need to obtain power via another power supply. However, supplying power only via POE is not sufficient to ensure continuous operation of the equipment. The network equipment cannot operate while the POE module has a breakdown. Therefore, the network equipment with the POE module still requires power from another power supply in order to ensure continuous operation of the equipment.

However, a power switch apparatus is required to switch efficiently from power supply through the Ethernet to another power supply and vice versa.

The inventors of the present invention believe that the shortcomings above can be remedied and suggest the present invention, which is of reasonable design, and is an effective improvement based on deep research and theory.

SUMMARY OF THE INVENTION

The object of the present invention is to provide a power switching apparatus connected to a network equipment, the power switching apparatus being used to switch power generated by the Ethernet and by another power supply, and the power is supplied to the network equipment.

For achieving the object described above, the present invention provides a power switching apparatus, comprising: a first input port to connect to a first power terminal; a second input port to connect to a second power terminal; an output port to output a voltage; and a switching circuit connected to the first input port, the second input port and the output port, the switching circuit cutting off the voltage generated by the first power terminal and outputting the voltage generated by the second power terminal while the second power terminal is plugged into the second input port.

DETAILED DESCRIPTION OF THE PREFERRED EMBODIMENTS

Figure 1:
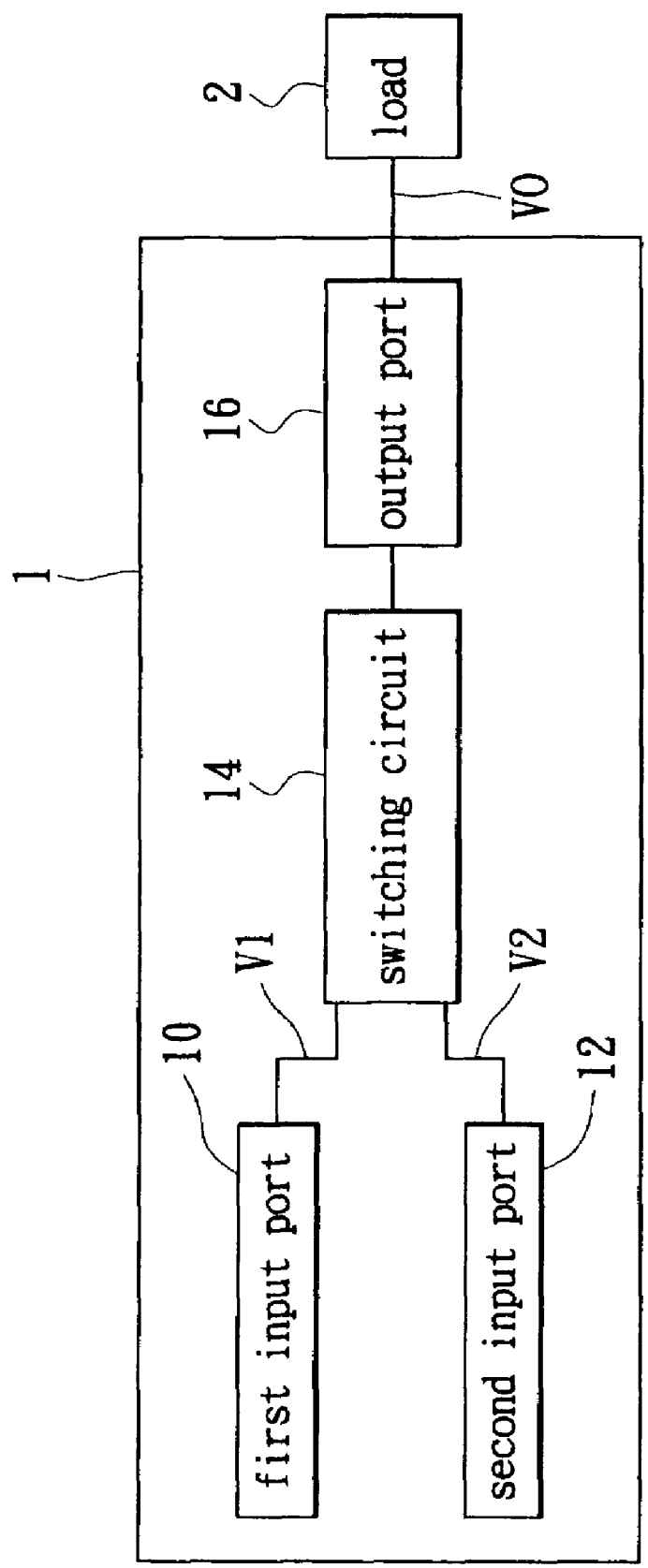
FIG. 1 is a schematic view of a network equipment of the present invention.

Please refer to FIG. 1, giving a schematic view of a network equipment of the present invention. The network equipment comprises a power switching apparatus 1 connected to a load 2, wherein the power switching apparatus 1 includes a first input port 10, a second input port 12, an output port 16 and a switching circuit 14.

The first input port 10 is used to connect to a first power terminal. The second input port 12 is used to connect to a second power terminal. The output port 16 is connected to the load 2 and outputs a voltage to load 2. The switching circuit 14 is connected to the first input port 10, the second input port 12 and the output port 16, and the switching circuit 14 cuts off the power generated by the first power terminal and outputs a voltage generated by the second power terminal while the second power terminal is plugged into the second input port 12. The first power terminal is the Ethernet power terminal, and the second power terminal is a direct current (D.C.) power terminal.

Please refer to FIG. 1. the power switching apparatus 1 is mounted inside the network equipment. The power switching apparatus 1 is connected to the Ethernet while the Ethernet power terminal is plugged into the first input port 10, wherein the Ethernet power terminal is a Registered Jack-45 terminal (RJ-45). Hereby, the Ethernet transmits a first voltage V1 to the first input port 10 of the power switching apparatus 1 via the RJ-45 terminal. Equally, the power switching apparatus 1 is connected to a D.C. power supply while the D.C. power terminal is plugged into the second input port 12. The D.C. power supply transmits a second voltage V2 to the second input port 12 of the power switching apparatus 1 via the D.C. power terminal.

Please refer to FIG. 1. The switching circuit 14 transforms the first voltage V1 into an output voltage V0 while the power switching apparatus 1 is only connected to the Ethernet. The output port 16 outputs voltage V0 to load 2. Equally, the switching circuit 14 transforms the second voltage V2 into the output voltage V0 while the power switching apparatus 1 is only connected to the D.C. power supply. The output port 16 also outputs the voltage V0 generated by the D.C. power supply to the load 2. The power switching apparatus 1 is connected to the Ethernet and the D.C. power supply simultaneously. While the D.C. power terminal is plugged into the second input port 12, the switching circuit 14 cuts off the voltage V1 generated by the Ethernet and outputs the voltage V2 generated by the D.C. power supply.

Figure 2:
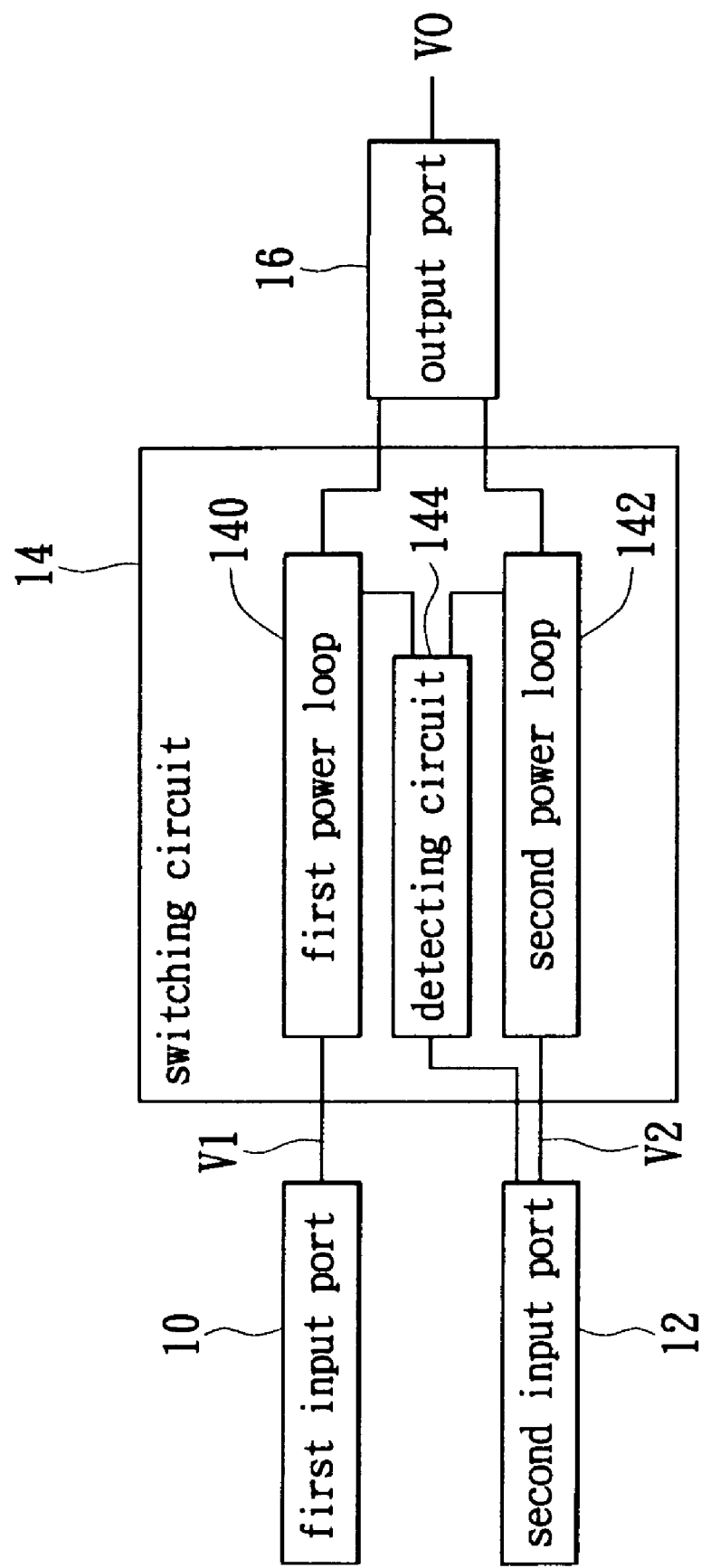
FIG. 2 is a schematic view of a power switching apparatus of the present invention.

Please refer to FIG. 2, giving a schematic view of a power switching apparatus of the present invention. The switching circuit 14 includes a first power loop 140, a second power loop 142 and a detecting circuit 144. The first power loop 140 is connected to the first input port 10 and to the output port 16. The first power loop 140 receives the first voltage V1 via the first input port 10, and transforms the first voltage V1, generated by the Ethernet, into the output voltage V0, and outputs the voltage V0 to output port 16. The second power loop 142 is connected to the second input port 12 and to the output port 16, the second power loop 142 receives the second voltage V2, generated by the D.C power supply, via the second input port 12, transforms the second voltage V2 into the output voltage V0, and outputs voltage V0 to output port 16.

The detecting circuit 144 is connected to the second input port 12, the first power loop 140 and the second power loop 142. The power switching apparatus 1 is connected to the Ethernet and the D.C. power supply simultaneously. While the D.C. power terminal is plugged into the second input port 12, the detecting circuit 144 cuts off the voltage V1 generated by the Ethernet and outputs the voltage V2 generated by the D.C. power supply.

Figure 3:
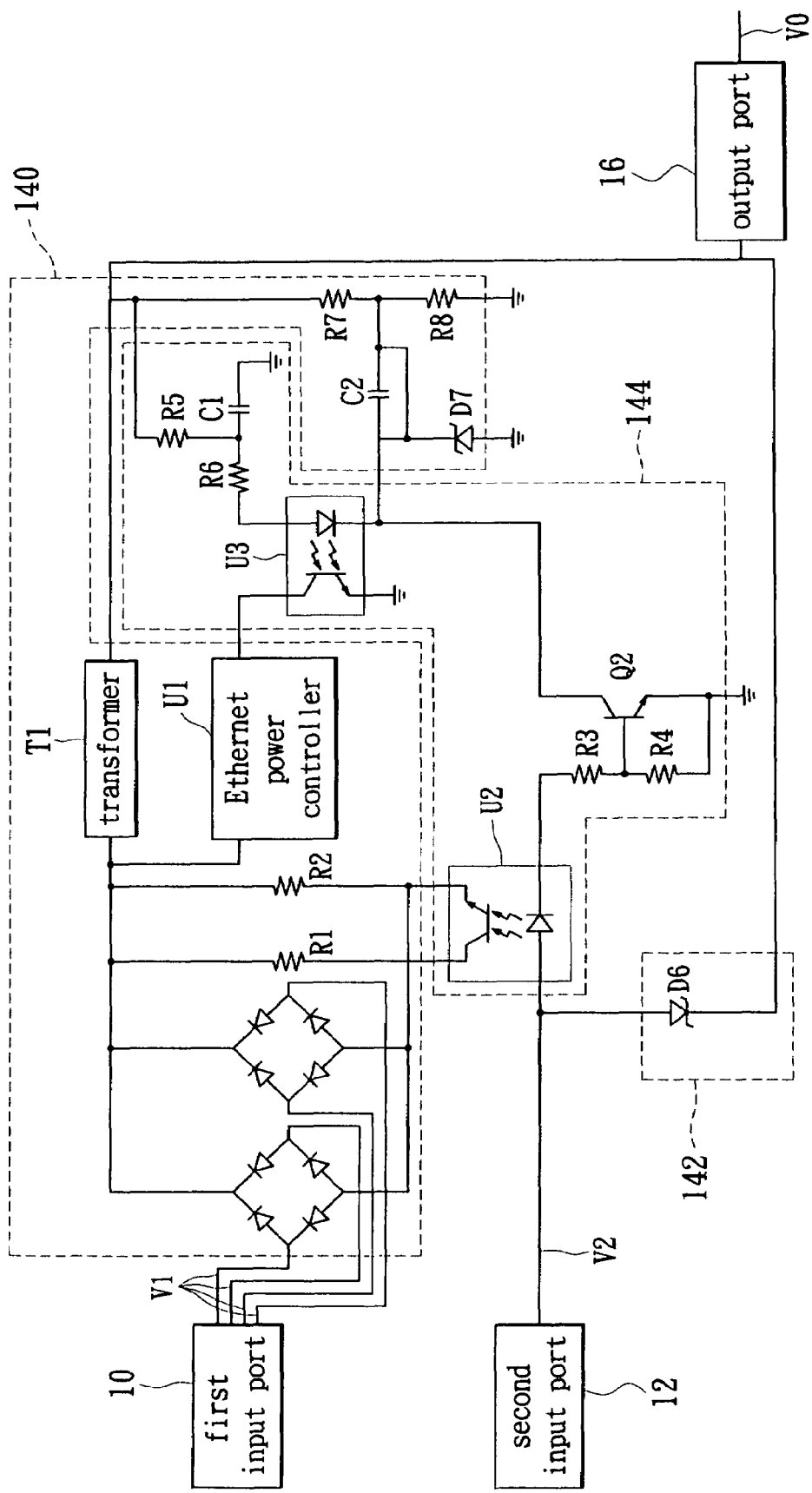
FIG. 3 is a schematic view of a switching circuit of the present invention.

Please refer to FIG. 3, illustrating a schematic view of a switching circuit of the present invention. The first power loop 140 includes a input resistance R2, a transformer T1, an Ethernet power controller U1 and a voltage regulator D7. The input resistance R2 is connected to the first input port 10 and receives the first voltage V1 generated by the Ethernet via the first input port 10. The transformer T1 has a primary end (input end) and a secondary side (output end). The primary side of the transformer T1 receives the power generated by the Ethernet via the input resistance R2, and the secondary side of the transformer T1 outputs the voltage V0. The Ethernet power controller U1 is connected to the input resistance R2 and the primary end of the transformer T1, and tunes the output voltage V0 which the secondary side of the transformer T1 outputs. The voltage regulator D7 is connected to the secondary side of the transformer T1 to stabilize the output voltage V0. The output voltage V0 doesn't change with the load 2 (FIG. 1) because the voltage regulator D7 is connected to the secondary side of the transformer T1.

Please refer to FIG. 3, the second power loop 142 includes a Zener diode D6, the positive end of the Zener diode D6 is connected to the second input port 12, the negative end of the Zener diode D6 is connected to the output port 16. The Zener diode D6 can stabilizes the second voltage V2 generated by the D.C. power supply and the output voltage V0 becomes stable.

Please refer to FIG. 3, the detecting circuit 144 comprises a first coupling element U2, an energy eliminating switch Q2 and a second coupling element U3. The first coupling element U2 is connected to the second input port 12 and the input resistance R2. The first coupling element U2 is on while the D.C. power terminal is plugged into the second input port 12, and an energy eliminating resistance R1 is connected to the input resistance R2 in parallel to reduce the effective value of the input resistance. The new value of the input resistance is R1R2/(R1+R2) and is smaller than the original input resistance (R2). The Ethernet will stop providing the first voltage V1 according to the new input resistance (the standard of IEEE 802.3af). The energy eliminating switch Q2 is connected to the first coupling element U2. The energy eliminating switch Q2 is on while the D.C. power terminal is plugged into the second input port 12. Besides, the second coupling element U3 is connected to the energy eliminating switch Q2 and the Ethernet power controller U1. While the energy eliminating switch Q2 is on, the Ethernet power controller U1 is disabled.

Please refer to FIG. 3. While the Ethernet power terminal is plugged into the first input port 10, the first power loop 140 starts to output the voltage V0 to output port 16. While the D.C. power supply is plugged into the second input port 12, the first coupling element U2 is on, and the energy eliminating resistance R1 is connected to input resistance R2 in parallel to reduce the effective value of the input resistance. The new value of the input resistance is R1R2/(R1+R2) and is smaller than the original value of the input resistance (R2), and the new value of the input resistance is smaller than 15 kΩ. The Ethernet stops outputting the first voltage V1 according to the new value of the input resistance (the standard of IEEE 802.3af). Simultaneously, the first coupling element U2 is on, the eliminating switch Q2 is on, the second coupling element U3 is on, the Ethernet power controller U1 is off, and the voltage regulator D7 stops the work of stabilizing the output voltage V0.

The power switching apparatus of the present invention is mounted on a network equipment. The power switching apparatus switches the power generated by the Ethernet and the D.C. power supply for the network equipment. When the network equipment receives the power generated by the Ethernet and the D.C. power supply simultaneously, the power switching apparatus cuts off the power generated by the Ethernet. Simultaneously the network equipment receives the power generated by the D.C. power supply. The power switching apparatus avoids wasting power, and simultaneously ensures continuous operation of the equipment.

While the invention has been described in terms of what are presently considered to be the most practical and preferred embodiments, it is to be understood that the invention is not limited to the disclosed embodiments. On the contrary, it is intended to cover various modifications and similar arrangements within the spirit and scope of the appended claims, which are to be accorded with the broadest interpretation so as to encompass all such modifications and similar structures.

What is claimed is:

1. A power switching apparatus, comprising:
    a first input port used to connect to a first power terminal, the first power terminal being an Ethernet power terminal;
    a second input port used to connect to a second power terminal, the second power terminal being a direct current power terminal;
    an output port used to output a voltage; and
    a switching circuit connected to the first input port, the second input port and the output port, the switching circuit including:
    a first power loop connected to the first input port and the output port, the first power loop being used to receive power supplied through the Ethernet power terminal, the first power loop including:
        a) an input resistance connected to the first input port, the input resistance receiving the power supplied through the Ethernet power terminal via the first input port;
        b) a transformer having a primary side and a secondary side, the primary side receives the power supplied through the Ethernet power terminal and the secondary side outputs a voltage;
        c) an Ethernet power controller connected to the input resistance and the primary side of the transformer, the Ethernet power controller tuning the output voltage which the secondary side of the transformer outputs; and
        d) a voltage regulator connected to the secondary side of the transformer, the voltage regulator stabilizing the output voltage;
    a second power loop connected to the second input port and the output port, the second power loop being used to receive power supplied through the direct current power terminal; and
    a detecting circuit connected to the second input port, the first power loop and the second power loop, wherein the detecting circuit cuts off the output voltage supplied through the Ethernet power terminal and outputs the voltage supplied through the direct current power terminal coupled to the second input port, responsive to detecting the voltage supplied through the second input port.

2. The power switching apparatus as claimed in claim 1, wherein the Ethernet power terminal is an RJ-45 terminal.

3. The power switching apparatus as claimed in claim 1, wherein the Ethernet power terminal connects to the Ethernet.

4. The power switching apparatus as claimed in claim 1, wherein the direct current power terminal connects to a direct current power supply.

5. The power switching apparatus as claimed in claim 1, wherein the detecting circuit comprises
- a first coupling element connected to the second input port and the input resistance, the first coupling element being on while the voltage supplied through the direct current power terminal is coupled to the second input port, and an energy eliminating resistance is connected to the input resistance in parallel;
- an energy eliminating switch connected to the first coupling element, the energy eliminating switch being on while the voltage supplied through the direct current power terminal is coupled to the second input port; and
- a second coupling element connected to the energy eliminating switch and the Ethernet power controller, while the energy eliminating switch is on, the Ethernet power controller is disabled.

6. The power switching apparatus as claimed in claim 4, wherein the second power loop comprises a Zener diode, the Zener diode has a positive end and a negative end, the positive end of the Zener diode is connected to the second input port, the negative end of the Zener diode is connected to the output port, and the Zener diode stabilizes the output voltage generated by the direct current power supply.

7. A network equipment, comprising:
- a first input port used to connect to an Ethernet power terminal;
- a second input port used to connect to a direct current power terminal;
- an output port used to output a voltage;
- a switching circuit connected to the first input port, the second input port and the output port, the switching circuit including:
  - a first power loop connected to the first input port and the output port, the first power loop being used to receive power supplied through the Ethernet power terminal;
  - a second power loop connected to the second input port and the output port, the second power loop being used to receive power supplied through the direct current power terminal, the second power loop including a Zener diode, the Zener diode having a positive end and a negative end, the positive end of the Zener diode being connected to the second input port, the negative end of the Zener diode being connected to the output port, and the Zener diode stabilizes the output voltage supplied through the direct current power terminal; and
- a detecting circuit connected to the second input port, the first power loop and the second power loop, wherein the detecting circuit cuts off the output voltage supplied through the Ethernet power terminal and outputs the voltage supplied through the direct current power terminal coupled to the second input port, responsive to detecting the voltage supplied through the second input port; and
- a load connected to the output port, the load receiving the output voltage.

* * * * *